(12) United States Patent
Jacquin et al.

(10) Patent No.: US 11,861,372 B2
(45) Date of Patent: *Jan. 2, 2024

(54) INTEGRITY MANIFEST CERTIFICATE

(71) Applicant: Hewlett Packard Enterprise Development LP, Houston, TX (US)

(72) Inventors: Ludovic Emmanuel Paul Noel Jacquin, Bristol (GB); Nigel John Edwards, Bristol (GB); Thomas M. Laffey, Roseville, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/663,470

(22) Filed: May 16, 2022

(65) Prior Publication Data

US 2022/0276875 A1 Sep. 1, 2022

Related U.S. Application Data

(63) Continuation of application No. 16/565,915, filed on Sep. 10, 2019, now Pat. No. 11,360,784.

(51) Int. Cl.
*G06F 21/00* (2013.01)
*G06F 9/4401* (2018.01)
(Continued)

(52) U.S. Cl.
CPC .......... *G06F 9/4411* (2013.01); *G06F 9/3877* (2013.01); *G06F 9/442* (2013.01);
(Continued)

(58) Field of Classification Search
CPC ...... G06F 9/4411; G06F 9/3877; G06F 9/442; G06F 21/33; G06F 21/44; G06F 21/51; G06F 21/57
See application file for complete search history.

(56) References Cited

U.S. PATENT DOCUMENTS

| 7,870,399 B2 | 1/2011 | Bryant et al. |
| 8,312,271 B2 | 11/2012 | Bangerter et al. |

(Continued)

FOREIGN PATENT DOCUMENTS

| CN | 1439136 A | 8/2003 |
| CN | 1965530 A | 5/2007 |

OTHER PUBLICATIONS

Trusted Computing Group, "TPM 2.0 Library Specification", available online at <https://trustedcomputinggroup.org/resource/tpm-library-specification/>, Mar. 15, 2013, 9 pages.

(Continued)

*Primary Examiner* — Ghazal B Shehni
(74) *Attorney, Agent, or Firm* — Trop, Pruner & Hu, P.C.

(57) ABSTRACT

Examples disclosed herein relate to using an integrity manifest certificate to verify the state of a platform. A device identity of a device that has the device identity provisioned and stored in a security co-processor to retrieve an integrity proof from the security co-processor. The device includes at least one processing element, at least one memory device, and a bus including at least one bus device, and wherein the device identity is associated with a device identity certificate signed by a first authority. The integrity proof includes a representation of each of a plurality of hardware components including the at least one processing element, the at least one memory device, the at least one bus device, and a system board and a representation of plurality of firmware components included in the device. The integrity proof is provided to a certification station. The certification station determines that the integrity proof is an expected value based on an expected provisioning state of the device and the device identity. The certification station signs, using a second authority, an integrity manifest certificate, based on the (Continued)

integrity proof and the device identity. The integrity manifest certificate is stored.

20 Claims, 5 Drawing Sheets

(51) Int. Cl.
*G06F 9/38* (2018.01)
*G06F 21/33* (2013.01)
*G06F 21/44* (2013.01)
*G06F 21/51* (2013.01)

(52) U.S. Cl.
CPC .............. *G06F 21/33* (2013.01); *G06F 21/44* (2013.01); *G06F 21/51* (2013.01)

(56) References Cited

U.S. PATENT DOCUMENTS

| | | | |
|---|---|---|---|
| 8,566,606 B2 | 10/2013 | Movva et al. | |
| 8,949,997 B2 | 2/2015 | Schmidt et al. | |
| 9,147,086 B1 | 9/2015 | Potlapally et al. | |
| 9,246,690 B1 | 1/2016 | Roth et al. | |
| 11,017,090 B2 | 5/2021 | Jacquin et al. | |
| 11,095,454 B2 | 8/2021 | Goldman et al. | |
| 11,374,745 B1 | 6/2022 | Khare | |
| 2002/0107804 A1 | 8/2002 | Kravitz | |
| 2006/0010079 A1 | 1/2006 | Brickell | |
| 2006/0026423 A1 | 2/2006 | Bangerter et al. | |
| 2007/0143629 A1* | 6/2007 | Hardjono ............ | H04L 63/0823 713/181 |
| 2008/0098107 A1 | 4/2008 | Jones et al. | |
| 2008/0178257 A1 | 7/2008 | Mishina et al. | |
| 2008/0271163 A1 | 10/2008 | Stillerman et al. | |
| 2010/0235912 A1 | 9/2010 | Hermann et al. | |
| 2013/0290735 A1* | 10/2013 | Rombouts ............. | H04L 9/3265 713/189 |
| 2013/0298219 A1 | 11/2013 | Byrkit et al. | |
| 2014/0189890 A1 | 7/2014 | Koeberl et al. | |
| 2014/0359268 A1* | 12/2014 | Jauhiainen .............. | G06F 21/44 713/168 |
| 2015/0227744 A1 | 8/2015 | Horovitz et al. | |
| 2017/0093800 A1 | 3/2017 | Wiseman et al. | |
| 2017/0147356 A1 | 5/2017 | Kotary et al. | |
| 2017/0373828 A1 | 12/2017 | Michiels et al. | |
| 2018/0287780 A1 | 10/2018 | Safford et al. | |
| 2020/0260278 A1* | 8/2020 | Du ...................... | H04L 63/0823 |
| 2020/0364340 A1 | 11/2020 | Khoruzhenko | |

OTHER PUBLICATIONS

Bernard Marr, "How Blockchain Will Transform the Supply Chain and Logistics Industry", available online at <https://www.forbes.com/sites/bernardmarr/2018/03/23/how-blockchain-will-transform-the-supply-chain-and-logistics-industry/#4795483b5fec>, Mar. 23, 2018, 4 pages.

Jack Harris and Raquel Hill, "Building a Trusted Image for Embedded Systems," Apr. 2010, pp. 1-4, ACM.

Lavina Jain and Jayesh Vyas, "Security Analysis of Remote Attestation," CS259 Project Report, 2008, pp. 1-8, Stanford University.

TCG, "TCG Infrastructure WG TPM Keys for Platform Identity for TPM 1.2," Aug. 21, 2015, pp. 1-68, Specification Version 1.0, Revision 3.

Tom Dodson and Monty Wiseman, "Trusted Supply Chain & Remote Provisioning with the Trusted Platform Module Link," RSA Conference 2018, Apr. 2018, pp. 1-19.

Trusted Computing Group, "TCG Platform Attribute Credential Profile", available online at <https://trustedcomputinggroup.org/resource/tcg-platform-attribute-credential-profile/>, Jan. 16, 2018, 3 pages.

Trusted Computing Group, "TPM Keys for Platform Identity for TPM 1.2", available online at <https://trustedcomputinggroup.org/resource/tpm-keys-for-platform-identity-for-tpm-1-2-2/>, Aug. 21, 2015, 3 pages.

* cited by examiner

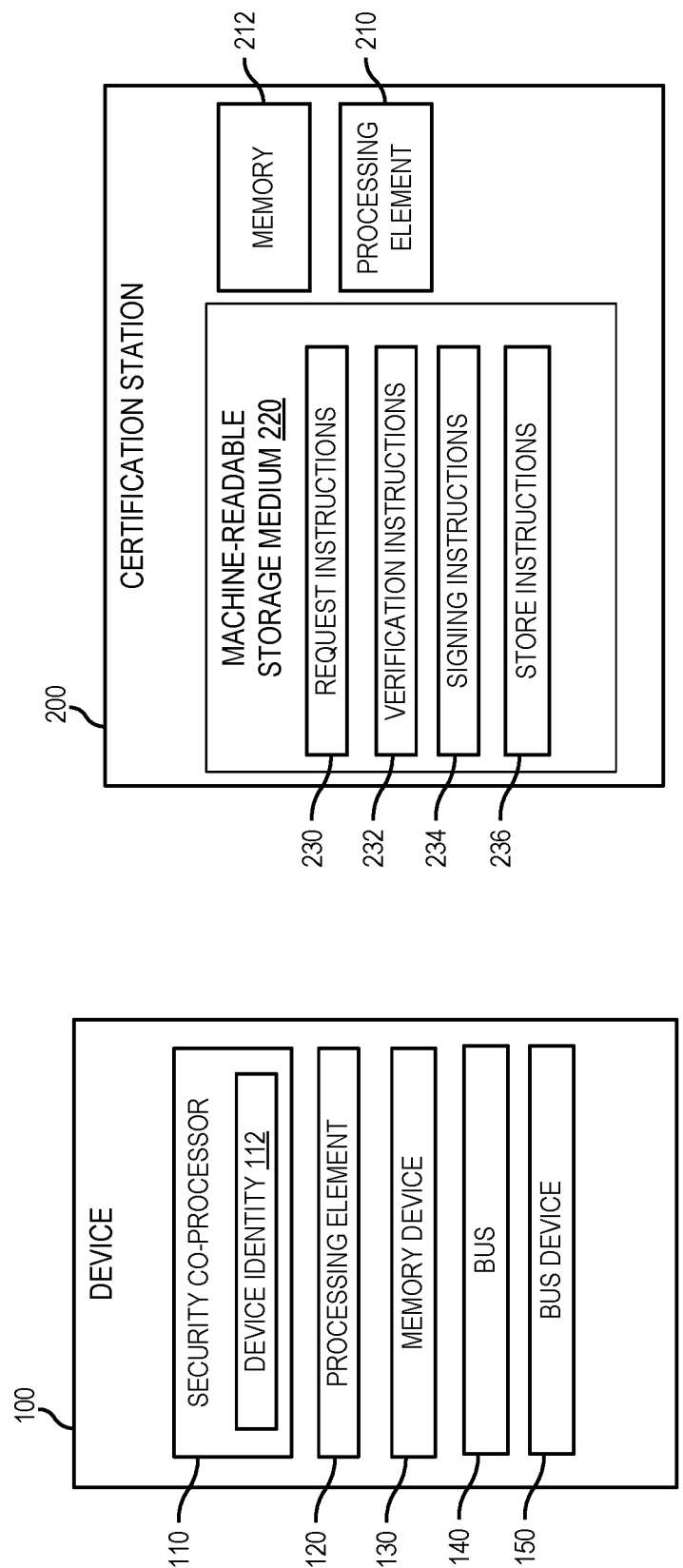

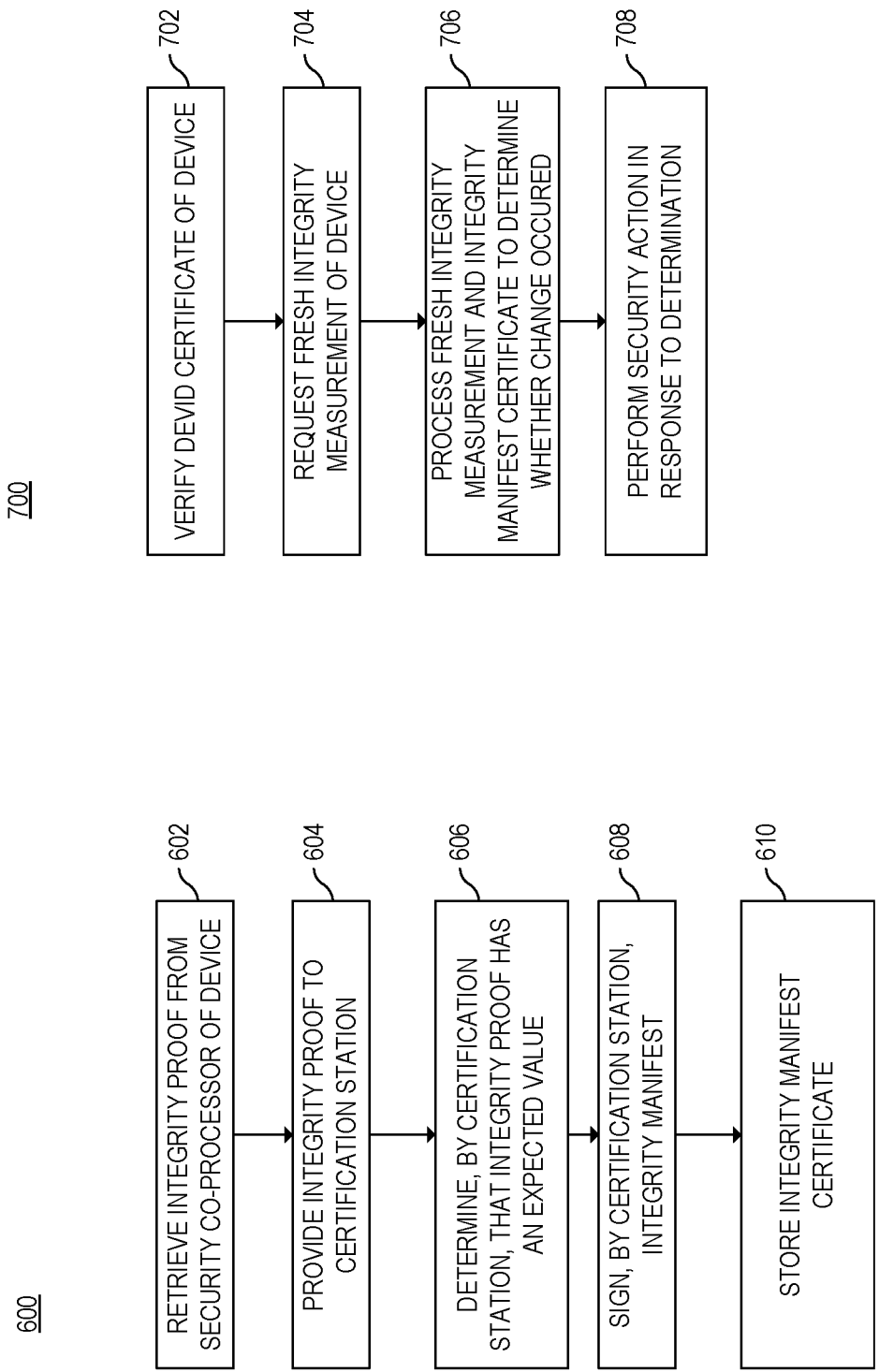

INTEGRITY MANIFEST CERTIFICATE

BACKGROUND

To provide reliable operation of a platform for an end-user, a platform manufacturer needs to enable the end-user to verify the authenticity of the platform. An authentication module or security co-processor consistent with the Trusted Platform Module (TPM) criteria conceived by Trusted Computing Group is an example security solution to detect authenticity of a platform. The TPM may be used to detect if a device of the platform is counterfeit, e.g., made by an unauthorized party or made in an unauthorized manner. The TPM may receive an instruction to authenticate each device of the platform, e.g., to check that the device is made by an authorized party in an authorized manner. During manufacturing of a device, the device manufacturer may instantiate a signed manufacturer identity in the device. Later on, the TPM may receive an instruction to verify the authenticity of the device by checking the validity of the manufacturer identity. The TPM may be implemented as a security co-processor chip that conforms with Trusted Computing Group specifications.

BRIEF DESCRIPTION OF THE DRAWINGS

The following detailed description references the drawings, wherein:

FIG. 1 is a block diagram of a device that includes a security co-processor capable of facilitating platform verification of a device, according to an example;

FIG. 2 is a block diagram of certification station that can be used to certify a platform, according to one example;

FIG. 6 is a flowchart of a method for certifying a platform, according to one example; and FIG. 7 is a flowchart of a method for certifying a platform, according to one example.

Figure 3:
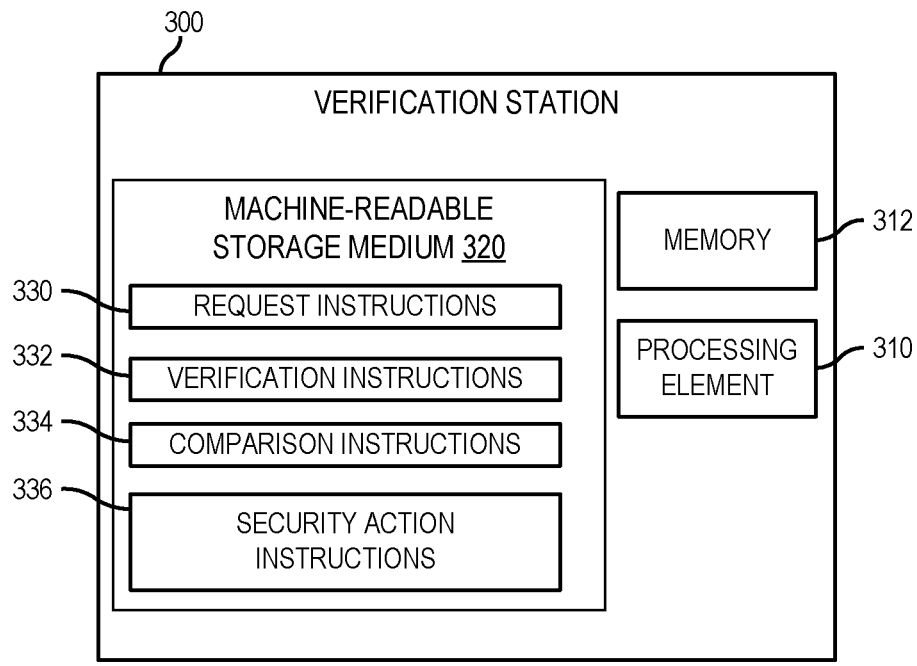
FIG. 3 is a block diagram of verification station that can be used to verify a platform, according to one example.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Various examples described herein provide for a process for enabling a manufacturer's customer to be able to verify that a platform (e.g., a device) the customer receives at their shipping bay has not been tampered with since it exited from the manufacturing chain. The approach provides an extension of a secure platform device identity (DevID) by also securing the platform's integrity fingerprint before leaving manufacturing line. The platform's integrity fingerprint can then be used by the customer to verify that the received platform has not been modified during shipping.

Customers can be concerned with detecting supply chain attacks. This disclosure provides examples to provision platforms with an integrity manifest— captured during manufacturing of a given platform—authenticated by a manufacturer (e.g. via a cryptographic signature). Using that authenticated integrity manifest-along with a verification software, customers can validate that the platform they received is in the same state (e.g. same firmware installed, no modification of components such as daughterboards, etc.) as when it left manufacturing. Additionally, this may provide assurance to a customer about which manufacturing facilities was used (e.g. the platform was manufactured in a given country, by this particular contract manufacturer, etc.). Thus, the supply chain can be certified using this approach. Please note that though the customer use case is used as a benefit of the system throughout, it is contemplated that the approaches described herein can be used by others to verify the integrity of the platform in different use cases.

Examples described herein include use of a security co-processor such as a Trusted Platform Module (TPM). The security co-processor be implemented using a specification that provide required features for supporting examples described herein (e.g., software tamper proof storage for integrity measurements, protected cryptographic keys and engine, etc.).

A platform's integrity manifest can be provisioned during manufacturing and customer verification of the received platform can be performed upon receiving the platform. The platform is provisioned when it is still in a trusted environment with the correct manifest. Then, later (e.g., after shipping to the customer) data is retrieved from the platform and processed to appraise the platform in order to be able to detect any tampering while the platform was shipped to the customer. As used herein, a "platform" can be considered a device that includes a security co-processor and where the device includes hardware components and one or more firmware or software components to execute on one or more of the hardware components.

Technology Explanation and Definitions

Attestation, in general, refers to a process by which one electronic device, called a "verifier", challenges another electronic device, such as a computer platform, to check whether the platform is trustworthy. The attestation relies on measurements of the platform. More specifically, before the platform is challenged by the verifier, the platform performs measurements of itself, relying on a trusted computing base of the platform. These measurements form a log of measurements that are stored by the platform in a platform memory. In this context, a "trusted computing base" refers to a set of hardware, firmware and/or software components of the platform, which form the core of security for the platform. In other words, the trusted computing base may be inherently trusted software, hardware, or some combination thereof. After the platform performs the trusted computing base measurements, the platform may securely store cryptographic hashes of its measurements in a secure memory of the platform, such as platform configuration registers (PCRs) inside a security component (e.g., a security co-processor or a trusted platform module) of the platform. The platform may perform the measurements at particular power state of the platform such as, for example, when the platform boots up.

The verifier initiates the challenge of the platform by providing an attestation request to the platform, and a security component of the platform responds to the attestation request with an authenticated digest of the measurement hashes. In this context, an "authenticated digest" refers to a set of measurements of the platform, which are signed by a security component of the platform. A TPM quote (also called a "PCR quote" herein), containing PCR values, is an example of an authenticated digest, although the authenticated digest may take on other forms, in accordance with further example implementations.

In accordance with example implementations, the attestation request can contain a nonce, which is a one-time number that is used for identification purposes so that the corresponding authenticated digest may be associated with the request and not be a replayed version of a previous authenticated digest. In this manner, in accordance with example implementations, the authenticated digest that is provided by the secure component of the platform contains the nonce from the attestation request (to verify that the authenticated digest was generated after the attestation request containing the nonce) and the measurement hashes (e.g., the platform's PCR content). Moreover, the secure component of the platform digitally signs the authenticated digest so that a corresponding digital signature is provided with the authenticated digest. The platform may also respond to the attestation request with the log of measurements, which the verifier may validate using the measurement hashes.

The above-described attestation process may allow the verifier to determine whether tampering has occurred with a platform. For example, if tampering has occurred, this tampering may be detectable by the verifier due to the PCR content being reset (due to a resetting of the platform) or due to the measurement hash values not corresponding to the log of measurements.

A device can be processed during its manufacture to include a manufacturer-signed digital certificate associated with the device, which can serve as a trusted form of identification for the device. The process typically involves generating and installing the manufacturer-signed digital certificate at some point during manufacture of the device (e.g., before the computing device is shipped to a retailer or customer). In some examples, customer information can be included in the manufacturer-signed digital certificate. In some examples, the manufacturer-signed digital certificate may also be based on device identification information about the device, for example, a model number, a serial number, an external color, a hash of a firmware, a date of manufacture, and the like. The manufacturer-signed digital certificate can serve as a device identity for a device or platform.

In some examples, a TPM is a security co-processor with which one can only interact through an Input/Output (I/O) buffer that uses a well-defined formatting. The TPM behavior is exclusively based on the (series of) command(s) it receives. Thus any guarantee one can get from the TPM is based on the commands issued. Prototypical examples are the measured boot and remote attestation mechanisms, which are built over the use of the TPM Platform Configuration Registers to remotely verify the state of a platform. PCRs are updated by hashing their previous value with the information to store. In the measured boot case, PCRs are used to store firmware and software integrity value. Using PCRs prevents removal of firmware or software execution events. In the examples described herein, a firmware or software component cannot erase its measurement event from the PCRs. Further, a manufacturer can predict expected PCR value for a device or platform because the manufacturer would know what firmware or software should be executed. As used herein, firmware can include multiple components that can be programmed, for example a field programmable gate array bitstream, a Serial Peripheral Interface (SPI) flash, an electronically erasable programmable read only memory (EEPROM), etc. in the platform. Unused programmable logic can also be measured (and can be a known value, for example 0 or a repeating pattern).

As used herein, a "certificate authority" (CA) is a trusted entity that issues digital certificates. Digital certificates are data files that can be used to cryptographically link an entity with a public key. In a public key infrastructure (PKI), CAs can issue certificates that can be used to authenticate via public means. In some examples, a digital certificate can include an owner's identification information (e.g., a name, an address, etc.) and a digital signature of an entity (e.g., a certificate authority, a manufacturer, or the like). A digital certificate may also include the entity's public key, an expiration date for the certificate, etc. A person or entity that needs a digital certificate can request one from a certificate authority. The CA can verify the applicant's identity and generate a digital certificate for the applicant and digitally signs that certificate with the CA's private key. The digital certificate can then be authenticated using the CA's public key. A verifier can verify that a certificate is signed by a particular authority or private key using a public key.

In certain examples, a CA activity can begin with a root certificate. The root certificate is used as the basis of trust for certificates issued by the authority. The root certificate along with a private key associated with the certificate can be treated with a high level of security and may be stored in an offline protected facility. The CA can use the root certificate to create one or more intermediate certificates, which can be used to sign digital certificates issued by the authority. In some examples, intermediate certificates can be used to issue digital certificates through registration authorities (RAs). The CA may delegate some or all of the requirements to authenticate to the RA for a particular domain namespace associated with the RA.

These concepts are leveraged throughout the document. In particular, a private key can be secure in the security co-processor for a device. The private key can be used to sign information at the security co-processor. A public key can be provided to ensure that the signature from the security co-processor is valid. Similarly, a CA has a private key that can be used to sign certificates that can be used throughout the document. Public keys can be provided to verify that the certificates are signed by the CA.

FIG. 1 is a block diagram of a device that includes a security co-processor capable of facilitating platform verification of a device, according to an example. The device 100 can include a security co-processor 110 provisioned with a device identity 112, a processing element 120, a memory device 130, a bus 140, and one or more bus device 150. Examples of a device may include a switch, a router, a server, a desktop computer, a phone, an appliance, or any other computing device with the components and features described herein. The device can be operated in the systems of FIGS. 4 and 5 for creating an initial integrity manifest certificate and later verifying the device.

A processing element 120, such as a central processing unit (CPU) or a microprocessor suitable for retrieval and execution of instructions and/or electronic circuits can be configured to perform the functionality of various software components. In certain scenarios, instructions and/or other information, such as firmware, database information, etc., can be included in memory devices 130 or other memory. Input/output interfaces may additionally be provided by the device 100. In one example, input devices, such as a keyboard, a sensor, a touch interface, a mouse, a microphone, etc. can be utilized to receive input from an environment surrounding the computing device 100. Further, an output device, such as a display, can be utilized to present information to users. Examples of output devices include speakers, display devices, amplifiers, etc. Moreover, in certain examples, some components can be utilized to implement functionality of other components described herein. Input/output devices such as communication devices like network communication devices or wireless devices can also be considered devices capable of using the input/output interfaces.

In some examples, device 100 includes one or more firmware engine. A firmware engine can be implemented using instructions executable by a processor and/or logic. In some examples, the firmware engine can be implemented as platform firmware. Platform firmware may include an interface such as a basic input/output system (BIOS) or unified extensible firmware interface (UEFI) to allow it to be interfaced with. The platform firmware can be located at an address space where the processing element 120 (e.g., CPU) for the device 100 boots. In some examples, the platform firmware may be responsible for a power on self-test for the device 100. In other examples, the platform firmware can be responsible for the boot process and what, if any, operating system to load onto the device 100. Further, in the case of an appliance a simple switch, etc. the platform firmware may represent the operating system of the device 100.

The platform firmware may be capable to initialize various components of the device 100 such as peripherals, memory devices 130, memory controller settings, storage controller settings, bus speeds, video card information, etc. In some examples, platform firmware can also be capable to perform various low level functionality while the device 100 executes. Moreover, in some examples, platform firmware may be capable to communicate with a higher level operating system executing on a CPU, for example via an advanced configuration and power interface (ACPI).

In certain examples, the processing element may execute an Operating System. The Operating System is a system software that manages computer hardware and software resources and provides common services for computer programs. The OS can be executable on processing element 120 and loaded to memory devices 130. The OS is a high level OS such as LINUX, WINDOWS, UNIX, a bare metal hypervisor, or other similar high level software that a boot firmware engine of the computing device 100 turns control of the device 100 to.

The components of device 100 can interact with a certification station 200 to certify the device 100 (e.g., during a manufacturing state) and a verification station 300 to verify the device 100 is in the same condition at a later time.

In some examples, the device 100 can be provisioned, at manufacturing, with a software stack that includes a secure or measured boot upon startup. In one example, a firmware engine can take an inventory and store the inventory as a stored inventory. The stored inventory can include an inventory of multiple components that may be desirous to be protected and tracked.

Examples of devices or components to be inventoried include one or multiple processing elements 120, memory devices 130, a system board and/or multiple components of the system board, bus devices 150 on one or multiple bus 140 (e.g., a PCIe bus), a controller hub and/or devices connected to the controller hub, field replaceable unit enclosures, a northbridge device, other ASICs, etc.

As used herein, the system board is the main printed circuit board used for the device 100 and allows communication between many of the components of the device, for example, the processing element 120, the memory device 130, peripherals, bus devices, etc. In some examples, a controller hub can be an I/O controller hub, for example a southbridge. The controller hub may be used to manage data communications between a CPU and other components of the system board. In some examples, a controller hub may have direct media interface to a northbridge device or the CPU. Further the controller hub may provide peripheral support for the device, such as bus connections like Universal Serial Bus (USB), Peripheral Component Interconnect (PCI), PCI express, PCI extended, serial AT attachment, audio circuitry, integrated Ethernet, enhanced host controller interfaces, combinations thereof, etc. Other examples of identifiers that can be used include system board revision identifiers, complex programmable logic device revision identifiers, ASIC stepping identifiers, platform and chassis identifiers, riser identifiers, embedded controller identifiers, battery and power identifiers, storage component identifiers, etc. These are examples of what may be included as components to be inventoried. These can change based on the device. For example, a server may have a northbridge and a southbridge, while a switch or other appliance may have less components.

Firmware and/or software associated with one or more of the components may also be measured and stored in registers of the security co-processor. In the TPM context, the measurements can be stored in PCRs. Measurements can include, for example, a hash of a digest including the inventory. The inventory can include information about specific firmware and/or software that can be measured. Examples of this include firmware, software, and/or configurations. The measurements stored in the PCRs as part of the boot process can be considered a platform integrity measurement.

As noted, the device 100 includes at least one processing element 120. The processing element 120 can be configured to execute instructions stored on a memory device 130. In some examples, for example, in the case of a server, one of the processing elements can include a BMC. In other examples, a main processing unit can execute the instructions. In various examples in FIGS. 4 and 5, the device 100 performs various actions. This can be implemented using an interface of the device 100 coupled to a bus device 150 or another processing element 120 that is capable of performing the actions described in a particular device implementation. In some examples, a processing element or bus device performing the actions described can have a bus to communicate with the security co-processor 110.

In some examples, the device can be a server and the server can include a baseboard management controller (BMC). The BMC can be used to implement services for the device 100. BMC can be implemented using a separate processor from the processing element 120 that is used to execute a high level operating system. BMCs can provide so-called "lights-out" functionality for computing devices. The lights out functionality may allow a user, such as a systems administrator, to perform management operations on the device 100 even if an operating system is not installed or not functional on the computing device. Moreover, in one example, the BMC can run on auxiliary power, thus the device 100 need not be powered on to an on state where control of the device 100 is handed over to an operating system after boot. As examples, the BMC may provide so-called "out-of-band" services, such as remote console access, remote reboot and power management functionality, monitoring health of the system, access to system logs, and the like. As used herein, a BMC has management capabilities for sub-systems of a device 100, and is separate from a processor or processing element 120 that executes a main operating system of a computing device (e.g., a server or set of servers).

As noted, in some instances, the BMC may enable lights-out management of the device 100, which provides remote management access (e.g., system console access) regardless of whether the device 100 is powered on, whether a primary network subsystem hardware is functioning, or whether an OS is operating or even installed. The BMC may comprise an interface, such as a network interface, and/or serial interface that an administrator can use to remotely communicate with the BMC. As used herein, an "out-of-band" service is a service provided by the BMC via a dedicated management channel (e.g., the network interface or serial interface) and is available whether the device is in powered on state.

In some examples, a BMC may be included as part of an enclosure. In other examples, a BMC may be included in one or more of the servers (e.g., as part of the management subsystem of the server) or connected via an interface (e.g., a peripheral interface). In some examples, sensors associated with the BMC can measure internal physical variables such as humidity, temperature, power supply voltage, communications parameters, fan speeds, operating system functions, or the like. The BMC may also be capable to reboot or power cycle the device. As noted, the BMC allows for remote management of the device, as such, notifications can be made to a centralized station using the BMC and passwords or other user entry can be implemented via the BMC.

In some examples, the device can track events in one or more logs. The logs can include information about any time that a PCR register is changed. As noted above, each time a PCR register change, it is updated by hashing the previous value. A log of these events can later be played back to determine a comparison point for a verifier. In some examples, a subset of possible actions that can be logged can be valid operations (e.g., boot operations) for verification and if a non-valid operation is found in a log, the integrity of the device can be considered compromised.

FIG. 2 is a block diagram of certification station that can be used to certify a platform, according to one example. The certification station can be used in a system in conjunction with a device 100 to certify and store an initial integrity manifest certificate for the platform as further described in relation to FIG. 4.

The certification station 200 can be implemented as a computing device that includes, for example, a processing element 210, and a machine-readable storage medium 220 including instructions 230, 232, 234, 236 for certifying a manifest for a platform (e.g., device 100). Certification station 200 may be, for example, a server, a notebook computer, a slate computing device, a desktop computer, a portable reading device, a wireless email device, a mobile phone, or any other computing device.

Processing element 210 may be, one or multiple central processing unit (CPU), one or multiple semiconductor-based microprocessor, one or multiple graphics processing unit (GPU), other hardware devices suitable for retrieval and execution of instructions stored in machine-readable storage medium 220, or combinations thereof. The processing element 210 can be a physical device. Moreover, in one example, the processing element 210 may include multiple cores on a chip, include multiple cores across multiple chips, multiple cores across multiple devices (e.g., if the certification station 200 includes multiple node devices), or combinations thereof. Processing element 210 may fetch, decode, and execute instructions 230, 232, 234, 236 to sign an integrity manifest for the platform. As an alternative or in addition to retrieving and executing instructions, processing element 210 may include at least one integrated circuit (IC), other control logic, other electronic circuits, or combinations thereof that include a number of electronic components for performing the functionality of instructions 230, 232, 234, 236.

Machine-readable storage medium 220 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 220 may be encoded with a series of executable instructions for signing an integrity manifest for a platform.

In some examples, the certification station 200 is connected to a device that is to be provisioned. The device 100 can expose an interface to the certification station for communication to the security co-processor 110. Various interfaces can be used, for example, a serial connection such as a Universal Asynchronous Receiver/Transmitter (UART), an I2C bus, a SPI bus, etc. In some examples, a connection can be direct to the security co-processor (e.g., via a header and direct connection), in other examples, a connection can be via intermediary microcontrollers (e.g., a BMC, a microcontroller connected to an interface, etc.) or the processing element 120. In some examples, the processing element 120 can be connected via an interface to the certification station.

The certification station 200 can be connected via a connection to a certificate authority. In some examples, this can be via a secure network connection.

FIG. 3 is a block diagram of verification station that can be used to verify a platform, according to one example. The verification station can be used in a system in conjunction with a device 100 to verify that a platform is in a same state or an expected state as a time when an initial integrity manifest certificate was generated for the platform as further described in relation to FIG. 4.

The verification station 300 can be implemented as a computing device that includes, for example, a processing element 310, and a machine-readable storage medium 320 including instructions 330, 332, 334, 336 for certifying a manifest for a platform (e.g., device 100). Verification station 300 may be, for example, a server, a notebook computer, a slate computing device, a desktop computer, a portable reading device, a wireless email device, a mobile phone, or any other computing device.

Processing element 310 may be, one or multiple central processing unit (CPU), one or multiple semiconductor-based microprocessor, one or multiple graphics processing unit (GPU), other hardware devices suitable for retrieval and execution of instructions stored in machine-readable storage medium 320, or combinations thereof. The processing element 310 can be a physical device. Moreover, in one example, the processing element 310 may include multiple cores on a chip, include multiple cores across multiple chips, multiple cores across multiple devices (e.g., if the verification station 300 includes multiple node devices), or combinations thereof. Processing element 310 may fetch, decode, and execute instructions 330, 332, 334, 336 to verify the integrity for a platform. As an alternative or in addition to retrieving and executing instructions, processing element 310 may include at least one integrated circuit (IC), other control logic, other electronic circuits, or combinations thereof that include a number of electronic components for performing the functionality of instructions 330, 332, 334, 336.

Machine-readable storage medium 320 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 320 may be encoded with a series of executable instructions for verifying the integrity of a platform.

In some examples, the verification station 300 is connected to a device that is to be verified. The device 100 can expose an interface to the certification station for communication to the security co-processor 110. Various interfaces can be used, for example, a serial connection such as a Universal Asynchronous Receiver/Transmitter (UART), an I2C bus, a SPI bus, etc. In some examples, a connection can be direct to the security co-processor (e.g., via a header and direct connection), in other examples, a connection can be via intermediary microcontrollers (e.g., a BMC, a microcontroller connected to an interface, etc.) or the processing element 120.

A communication network can use wired communications, wireless communications, or combinations thereof. Further, the communication network can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, a communication network can be in the form of a direct network link between devices. Various communications structures and infrastructure can be utilized to implement the communication network(s).

By way of example, devices can communicate with each other and other components with access to a communication network via a communication protocol or multiple protocols. A protocol can be a set of rules that defines how nodes of the communication network interact with other nodes. Further, communications between network nodes can be implemented by exchanging discrete packets of data or sending messages. Packets can include header information associated with a protocol (e.g., information on the location of the network node(s) to contact) as well as payload information.

Figure 4:
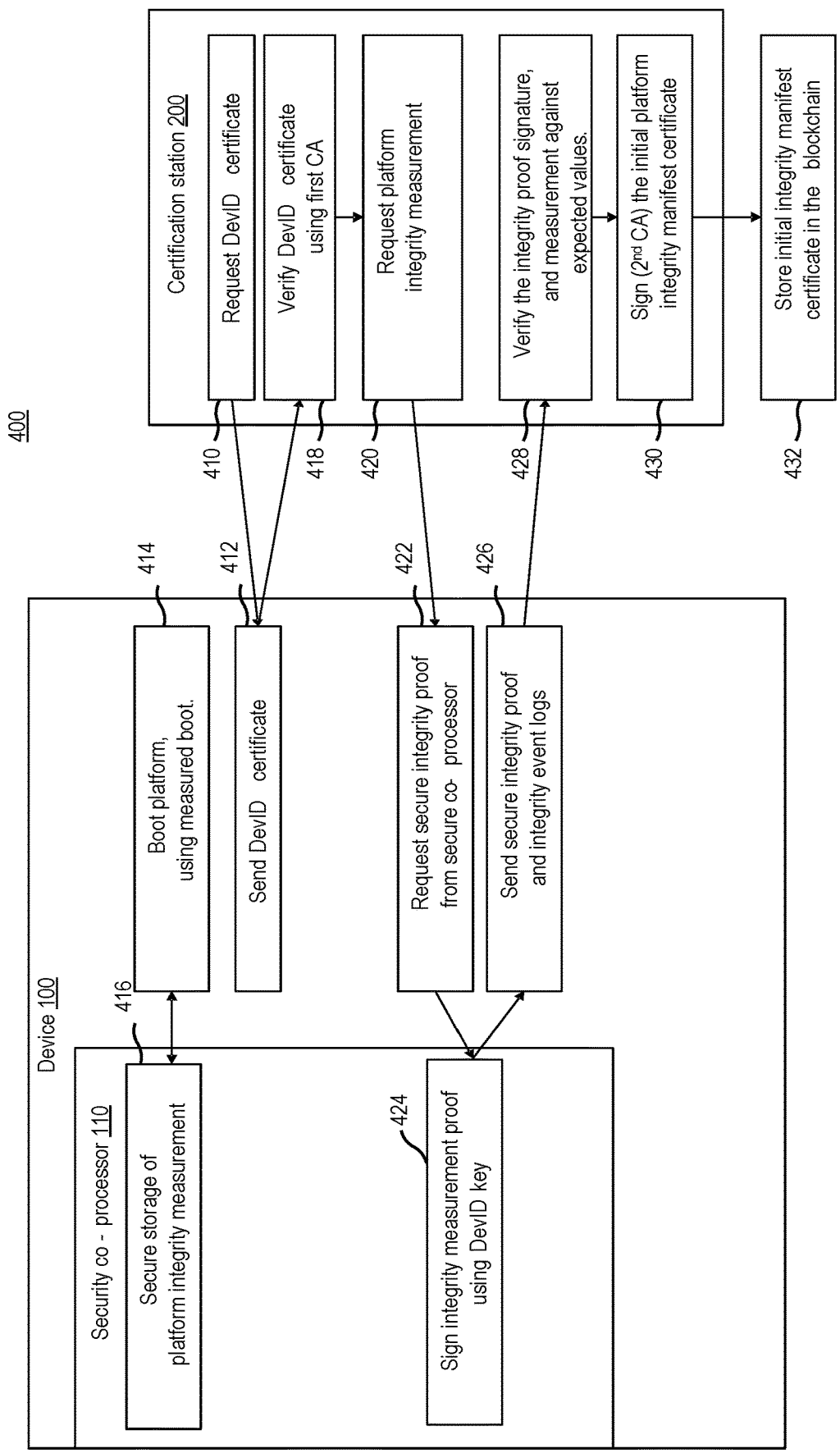
FIG. 4 is a block diagram of a flow of certifying a platform, according to one example.

FIG. 4 is a block diagram of a flow of certifying a platform, according to one example. System 400 includes a device 100 and a certification station 200 that are used to generate and store an initial integrity manifest certificate for the platform (e.g., device 100).

During manufacturing, the device 100 can be provisioned with a Device Identity (DevID). This is secured by being stored and usable only in the device's security co-processor (e.g., a TPM). The DevID includes a private key stored in the security co-processor. This allows the private key to be protected from malicious firmware or software running on the platform. An advantage of this approach is that if an attacker manages to run code on the platform, it won't be able to extract the private key to impersonate the platform later. The DevID can be associated with a public certificate. The public certificate can be, for example, an X.509 certificate or similar data structure. In one example, the data structure for the certificate includes information about the CA that issued the certificate, a serial number, and the DevID public key in a subject public key field. This public information can be retained by a manufacturer, provided by the security co-processor or another device on the platform, and be available to the certification station 200.

The device 100 can boot up. During boot, the device 100 can implement a secure boot or measured boot 414. As noted above, during the boot process, an inventory of components and/or firmware and/or software can be taken.

During the boot process, the instructions being executed as part of the boot process can cause secure storage of a platform integrity measurement at 416. As noted above, in the context of a TPM, the platform integrity measurement can be stored in PCRs.

The device 100 can be connected to the certification station 200 using an interface. The device 100 can be powered on and brought up. The certification station 200 can begin the certification process at 410, where the processing element 210 of the certification station 200 can execute request instructions 230 to request a DevID certificate from the device 100. The DevID 112 is stored in the security co-processor 110. A public certificate can be provided to the certification station 200. The public certificate can be stored at a security co-processor 110, a TPM, another location on the device 100 or platform, or the like. In this case, the device 100 can send the DevID certificate to the certification station at 412. In some examples, the certification station 200 may have access to the public certificate via another means, for example, a database that identifies the device 100 using an identifier such as a serial number.

The certification station 200 can verify the DevID certificate using the first CA authority. The first CA is to have signed the DevID certificate. Once the DevID certificate is received by the certification station at 418, the verification instructions 232 are executed to verify, using the first CA, the DevID. As noted, the certification station 200 can have a secure link to the first CA (e.g., a manufacturer authority) to validate the authenticity of a signature associated with the DevID certificate. In other examples, a certificate from the first CA may be used to validate the authenticity of the signature.

After the DevID of the security co-processor 110 is verified, at 420, the request instructions 230 can be executed to request a platform integrity measurement from the device

100. The platform integrity measurement can be an integrity proof from the security co-processor 110. As noted, this measurement can be taken during a boot process such as a measured boot.

To obtain the integrity measurement, the DevID key can be used to securely retrieve the platform state captured in the security co-processor 110 (422). In the case of a TPM, this can include the information included in one or more platform configuration registers. Further, in the example of a TPM, this can be called a Quote. The integrity measurement proof can be signed using the DevID private key (424). The device 100 can send the secure integrity proof to the certification station (426). In some examples, the platform may also send integrity event logs.

At 428 the certification station can execute verification instructions 232 to verify that the platform state captured in the integrity measurement proof (e.g., in TPM PCRs) matches the expected manufactured device values for the components, firmware and/or software installed in the manufactured system (otherwise this could mean that there is an attack already happening during manufacturing). In some examples, a database can be created that map expected states of components and firmware to product SKUs, model numbers, device types, or other grouping units. Customizations can also be accounted for and expected states stored.

In some examples, for verifying the PCRs, the certification station may have access to the different event logs used to trace the modification of the PCRs. The integrity proof (and the associated log if needed), at 430, is then signed by a second certificate authority (CA) by executing signing instructions 234.

In some examples, a quote is received from a TPM. A Quote may need a nonce. In some examples, a well-known value can be used for the nonce. In other examples, the nonce is also included in the data to sign.

In some examples, the second CA may be a manufacturer wide CA, which can allow the second CA to authenticate the platform's state as a genuine manufacturer platform. A more fine-grained CA hierarchy could be used. For example a manufacturer can setup a dedicated CA for each release of a product, for a specific customer and restrict usage of the CA to the manufacturing lines of given countries. This allows the manufacturer to guarantee to customer the manufacturing lines used for their platforms. The signing can be based on the proof and the DevID 112.

The processing element 210 can execute store instructions 236 to store the signed integrity manifest certificate (432). In one example, the signed integrity manifest certificate is stored on the platform itself as it is integrity-protected by the CA signature. It could also be made available to a customer by other channels such as hosted on a website online, transmitted out-of-band by a secure mail, email, storage device, etc. At a later time, a verification station 300 can verify the platform state is the same or expected state as that when the initial integrity manifest certificate was created or last verified. In some examples, the device 100 is shipped to another location (e.g., to a customer).

Figure 5:
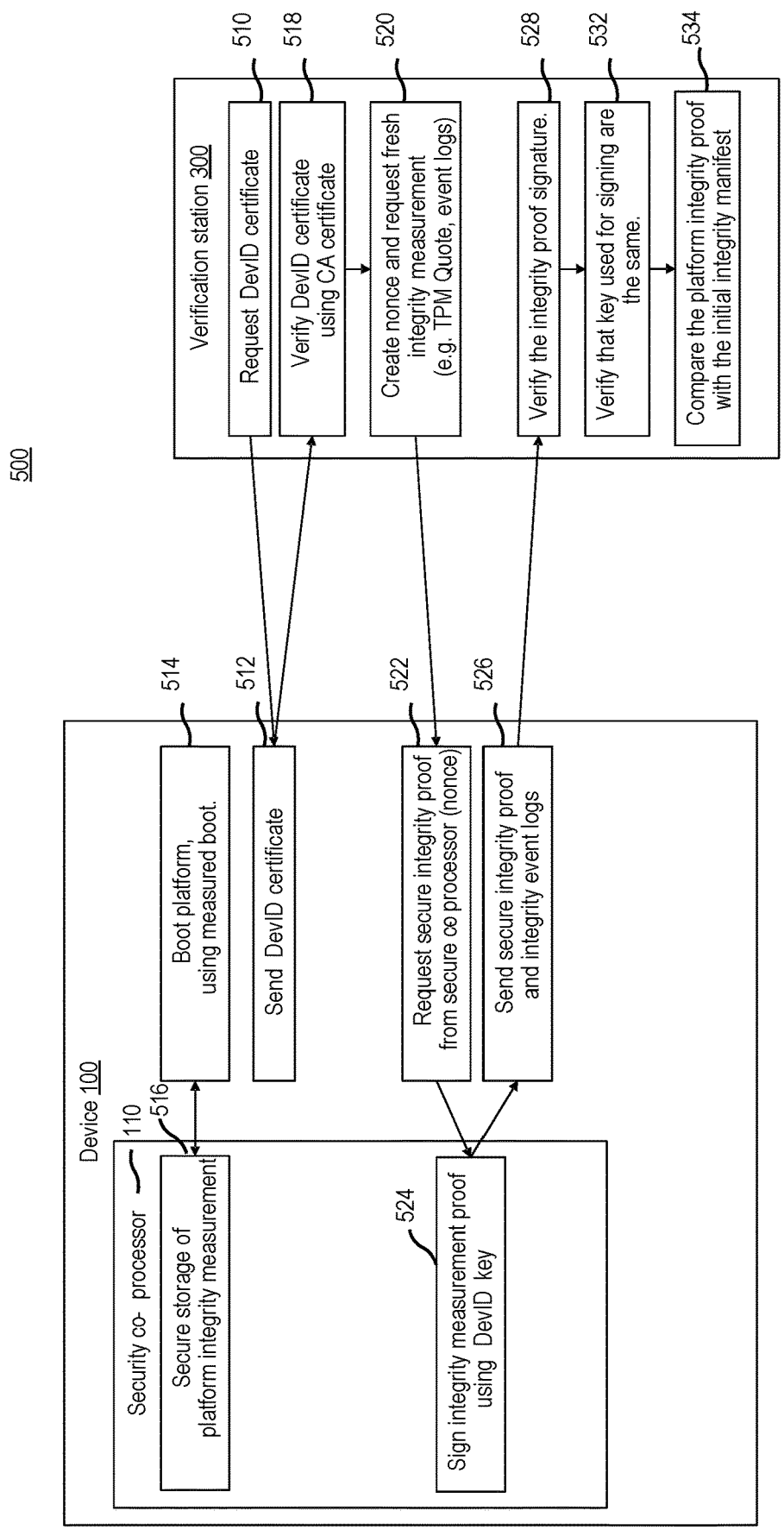
FIG. 5 is a block diagram of a flow of verifying a platform that has been certified, according to one example.

FIG. 5 is a block diagram of a flow of verifying a platform that has been certified, according to one example. As noted, this can occur after the certification station 200 creates an initial integrity manifest certificate. In one example, the device 100 can be shipped from a manufacturing site to a customer site and the customer can use the verification station 300 to perform verification.

A verifying entity can be provided a medium 320 including instructions that can be used to implement the verification station 300. Different software to be executed can be provided for different platforms or devices. The software is configured with a certificate representing the first CA used for signing the DevID certificate and the second CA used for signing the initial integrity manifest certificate. The certificates may be provided in one of various ways, for example, via a secure connection to the respective CAs, as a certificate that can be stored locally to verify the signatures, or the like.

Upon reception of a platform, the customer installs and runs software to validate the DevID of the device. To begin, the device 100 can be booted and execute a measured or secure boot at 514. During this process, registers of the security co-processor 110 are populated with platform integrity measurements as described above (516).

Request instructions 330 can be executed by the processing element 310 of the verification station 300 at 510 to request a DevID certificate from the device 100. This can be used to identify the device 100 is an authentic device that is certified by the first CA. The request can be sent via an interface to the device 100, which can respond. At 512, a processing element or bus device on the device 100 can respond to the request by sending the DevID certificate. In some examples, the processing element or bus device can request the DevID certificate from a secure storage, for example a secure storage in the security co-processor 110 or another storage location on the device 100. An interface can be used to send the DevID to the verification station 300.

At 518, the verification station 300 can verify the DevID certificate using a CA certificate associated with the first authority (e.g., a manufacturer authority). As noted above, in some examples, the DevID certificate can be verified using a local CA certificate (e.g., a public certificate). In other examples, the DevID certificate or information from the DevID certificate can be sent to the first CA for authentication using an application programming interface or another approach.

At 520, the request instructions 330 can be executed by processing element 310 to request a proof from the device of the state of integrity of the platform. In one example, a nonce can be used for the request. The nonce can be a fresh nonce.

At 522, the device 100 can run an attestation protocol to retrieve an integrity proof (e.g., a fresh Quote of the platform state using the DevID). This can also be signed using the DevID (524). Freshness of the integrity proof (e.g. using a new random nonce) is used because the platform may have been modified during shipping. Therefore, if an old nonce was used the procedure could be subject to replay attacks. The information for the integrity proof can include the same information or with expected changes. For example, if a boot counter was included in the integrity proof, an expected change can be an increment of the boot counter (or an increment of less than a certain number of the boot counter). For signing, the nonce, can be provided to the security co-processor, which has access to the platform integrity measurements (as well as other information such as counters. The security co-processor 110 can use the private key of the DevID to sign this information or portions of the information (including the nonce) and provide it to a processing element or bus device that is communicating with the verification station 300.

The integrity proof signed by the DevID and one or more logs (e.g., information about the state of the platform such as component identifiers, firmware information, etc.) can be provided to the verification station 300 (526). The information can be sent via an interface connecting the verification station 300 to the device 100.

At 528, verification instructions 332 can be executed to verify the fresh integrity proof. First, the public key of the DevID can be verified to verify that the signature is correct. The verification can also include verifying that the public key has been certified by a trusted authority (e.g., the first CA). As described above, a local CA certificate can be used or a connection to the CA can be used.

After the signature has been validated, the verification station can trust the platform's integrity values within the integrity proof (e.g., a TPM reboot counter, a clock, a digest of the PCRs, etc.). The digest of the PCRs are then used to validate the different event logs (e.g. UEFI, OS) that traces the firmware, software or configuration integrity value that were extended in the PCR at 514/516.

The verification station 300 can execute request instructions 330 to obtain the initial integrity manifest certificate. In one example, the request can be to the device 100, which can provide its initial integrity manifest certificate. In another example, another way can be used to provide the verification station 300 the initial integrity manifest certificate. As noted above, this can include blockchain, a web portal, storage media, or other approach.

At 532 the verification station 300 can execute verification instructions 332 to verify that the key used for signing the initial integrity manifest and the fresh integrity proof are the same (e.g., the DevID).

At 534, the platform integrity proof can be compared with the initial integrity manifest by executing comparison instructions 334. This can be based on expected changes to the state of the platform. This is done by going through the event logs in the entry—in chronological order—and recreating the intermediary value of each register (e.g., PCR in a TPM implementation) (in the event logs, the PCR being used can be recorded). After each of the entries have been used, the digest of the registers should now match the integrity proof's register digest. Changes made within the logs can be considered expected changes if the changes are included in a set of operations that are authorized. The event logs can be recreated using the values of the initial integrity manifest certificate as the starting point.

Once the new integrity proof is verified, the comparison instructions can verify the signed integrity proof of the platform (using the certificate of the second CA used for signing the quote during provisioning) and then compares the platform's integrity value within the integrity proof and initial integrity manifest (e.g. register values, reboot counter, etc.) in order to validate that the platform state has not been modified (or to evaluate what has been modified) since integrity manifest was created or last verified (e.g., during shipping).

This also enables customer to protect from counterfeiting as the customer would detect any platform which has not been provisioned completely by the manufacturer. The customer can also verify that the initial integrity manifest and the fresh integrity proof obtained at reception of the platform are signed by the same key in order to make sure the initial integrity manifest is from this particular platform.

Security action instructions 336 can be executed to perform an action based on the results. If any of the verification steps 518, 528, 532, 534 fail, remedies can be taken. For example, a notification can be sent to the manufacturer, the customer, the entity verifying, etc. In some examples, the device 100 can be blocked from booting up. In other examples, the security action can include a recommendation to not include the device 100 into the customer's infrastructure. Moreover, in some examples, the logs can be parsed to determine what the differences are between the current values of the integrity proof and the expected values. This information can be analyzed.

FIG. 6 is a flowchart of a method for certifying a platform, according to one example. Although execution of method 600 is described below with reference to certification station 200, other suitable components for execution of method 600 can be utilized (e.g., system 400). Additionally, the components for executing the method 600 may be spread among multiple devices. Method 600 may be implemented in the form of executable instructions stored on a machine-readable storage medium, such as storage medium 220, and/or in the form of electronic circuitry.

A device identity can be provisioned to a device or platform during a manufacturing process. The device identity can include a private key that is provisioned to a security co-processor such as a TPM. The device identity can also include a public key paired to the private key. The public key can be included in a public certificate. A first CA can be used to certify the public certificate for the device identity. In some examples, this is a manufacturer's CA.

The certification station can request the public certificate from the device or have another source for the public certificate (e.g., a database to look up a serial number). The certification station can validate that the public certificate is valid and signed by the first CA. If it isn't validated, the certification station can be alerted of a potential threat and can perform a security action (e.g., send a notification, an email, log the event, flag the device from being shipped, etc.). The certification station can then ask the device or platform for its current integrity proof.

The device or platform can boot up using a secure or measured boot process. During this process, logs can be kept by the system and records kept at registers in the security co-processor (in the case of a TPM, in a PCR). At 602, the certification station can ask the platform to retrieve the integrity proof for the platform at this state and the security co-processor can provide the integrity proof signed by the private key of the DevID. As such, the device identity of the device can be used to retrieve the integrity proof. The integrity proof can include a representation of each of multiple hardware components including a processing element, a memory device, a bus device, a system board. The integrity proof can also include a representation of multiple firmware components included on the device. Further, in some examples, the integrity proof can include a representation of software to execute on the processing element. In some examples, the software can include an image of an operating system or a part of the operating system provisioned for the device.

At 604, the device 100 can provide the integrity proof to the certification station. In some examples, this can be sent via an interface.

At 606, the certification station 200 can determine that the integrity proof is an expected value based on an expected provisioning state of the device and the device identity. In one example, the certification station can verify that the signature of the device identity is valid as part of the determination. In another example, the status of the registers can be compared to an expected value for the device based on the serial number or a model number of the device and the configuration that is expected for the device. Test devices can be used to create a database of the expected values.

At 608, the certification station can sign an integrity manifest certificate representing the device. In one example, a second CA is used to sign the integrity manifest certificate. In another example, the second CA and the first CA can be the same root CA. The certification station can include the integrity proof, which includes a representation of the components and at least one firmware or software representation of a component. Further, the certification station can include information used to verify the device identity (e.g., include the public certificate or a public key).

At 610, the certification station can cause storage of the integrity manifest certificate. The integrity manifest certificate can be stored in the device, be stored in a block chain, be send separately via a web portal, an email, a storage device, or the like. The device can be transferred to a customer or moved to another location and, at a later time, the integrity can be verified.

FIG. 7 is a flowchart of a method for verifying a platform, according to one example. Although execution of method 700 is described below with reference to verification station 300, other suitable components for execution of method 700 can be utilized (e.g., system 500). Additionally, the components for executing the method 700 may be spread among multiple devices. Method 700 may be implemented in the form of executable instructions stored on a machine-readable storage medium, such as storage medium 320, and/or in the form of electronic circuitry.

Subsequent to the signing of the integrity proof and a shutdown of the device, the device can be connected to a verification station and turned on. At 702, the verification station can verify a device identity certificate of the device being verified. A benefit of this verification is a trust that the security co-processor is the expected security co-processor that was provisioned with the DevID from the first CA. In one example, the verification station can query the device and receive a DevID certificate. The certificate can be validated as described above. In one example, if the certificate is not valid a security action can be performed as noted above because a potential threat may have occurred.

In response to a successful verification of the device identity certificate, the verification station can request a fresh integrity measurement from the device (704). This action is trusted because the security co-processor has been validated and the DevID provisioned from the first CA. When the private key from the DevID signs this using the security co-processor, a level of trust is provided. The device can be in a state where a measured or secure boot has occurred and security registers are populated. The device can retrieve and send, using the security co-processor the fresh integrity measurement to the verification station. In some examples, a nonce can be provided by the verification station and used for the fresh integrity measurement. As noted above, this can be signed using a private key from the DevID. Because the verification station has a public key paired with the DevID, the verification station can verify that the fresh measurement is authentic.

At 706, the verification station can process the fresh integrity measurement and the integrity manifest certificate to determine whether an unexpected change occurred. The integrity manifest certificate can be retrieved, either from the device or via another means as explained above. The verification station can have or obtain a public key associated with the second CA. The public key can be used to verify that the integrity manifest certificate is authentic. If the certificate is not authentic, a security action can be taken.

The integrity measurement from the fresh proof can be processed using an integrity event log, where the fresh integrity proof is processed using the integrity event log to determine a comparison point to compare the fresh integrity measurement with the integrity manifest certificate to determine whether an unexpected change occurred as explained above.

Also as noted above, the determination as to whether the unexpected change has occurred can be based on a number of times the device has been booted between verifications of the device. One attack vector that this protects from is excessive power cycling in attempts to break security by a malicious entity. At 708, a security action can be performed in response to a determination that an unexpected change occurred.

In some examples, a customer may wish to send the device to a reseller or other preparer to modify the device prior to receiving a final device. This can include, for example, adding a new PCIe card, replacing a device, etc. In this example, the verification process 700 can be followed to verify that the device was initially in the expected state when the reseller received it. Then a new certification process 600 can be performed after the modifications are complete. The new integrity manifest certificate can be signed by a third CA. In some examples, the third CA can be associated with the reseller or modifier. In some examples, the new integrity manifest certificate can include a link (e.g., a hash) to the previous, certified, integrity manifest that is being superseded. This can create a chain of integrity manifest certificate that can be extended as modification occurs on the platform.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations.

Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A method comprising:
   receiving, by a verification station, a device identity provided by a device;
   receiving, by the verification station, an integrity proof of the device, wherein the integrity proof is stored in a security co-processor of the device, and the integrity proof comprises a representation of a hardware component of the device and a representation of a firmware component of the device;
   determining, by the verification station, whether the integrity proof is an expected value based on an expected provisioning state of the device and the device identity; and
   responsive to the determination of whether the integrity proof is the expected value, signing, by the verification station, an integrity manifest certificate based on the integrity proof and the device identity to provide a signed integrity manifest certificate.

2. The method of claim 1, further comprising:
   requesting, by the verification station, the device identity from the device;
   verifying, by the verification station, the device identity; and
   responsive to the verification of the device identity, requesting, by the verification station, the integrity proof from the device.

3. The method of claim 1, wherein determining that the integrity proof is the expected value comprises comparing, by the verification station, the integrity proof to an initial integrity manifest corresponding to the device.

4. The method of claim 3, further comprising:
receiving, by the verification station, an integrity manifest certificate corresponding to the initial integrity manifest from a stored location associated with the security co-processor.

5. The method of claim 1, wherein the integrity proof represents event logs of the device, and the method further comprises:
determining the expected provisioning state of the device based on an initial integrity manifest corresponding to the device and the event logs.

6. The method of claim 1, further comprising determining the expected provisioning state of the device based on a number of times the device has been booted between verifications of the device.

7. The method of claim 1, further comprising:
performing a security action in response to the determination that the integrity proof is not the expected value.

8. The method of claim 1, further comprising:
verifying, by the verification station, a device identity certificate corresponding to the device identity; and
performing a security action in response to the verifying determining that the device identity certificate is not valid.

9. The method of claim 1, wherein the integrity proof further comprises a representation of at least one processing element of the device and a representation of a software to execute on the at least one processing element.

10. A system comprising:
a hardware processor; and
a memory to store instructions that, when executed by the hardware processor cause the hardware processor to:
receive a device identity provided by a device;
receive an integrity proof of the device, wherein the integrity proof is stored in a security co-processor of the device, and the integrity proof comprises a representation of a hardware component of the device and a representation of a firmware component of the device;
determine whether the integrity proof is an expected value based on an expected provisioning state of the device and the device identity; and
responsive to the determination of whether the integrity proof is the expected value, sign an integrity manifest certificate based on the integrity proof and the device identity to provide a signed integrity manifest certificate.

11. The system of claim 10, wherein the instructions, when executed by the hardware processor, further cause the hardware processor to:
request, by the verification station, the device identity from the device;
verify, by the verification station, the device identity and
responsive to the verification of the device identity, request, by the verification station, the integrity proof from the device.

12. The system of claim 10, wherein the instructions, when executed by the hardware processor, further cause the hardware processor to:
compare the integrity proof to an initial integrity manifest corresponding to the device.

13. The system of claim 10, wherein the instructions, when executed by the hardware processor, further cause the hardware processor to:
receive an integrity manifest certificate corresponding to the initial integrity manifest from a stored location associated with the security co-processor.

14. The system of claim 10, wherein the integrity proof represents event logs of the device, and the instructions, when executed by the hardware processor, further cause the hardware processor to:
determine the expected provisioning state of the device based on an initial integrity manifest corresponding to the device and the event logs.

15. The system of claim 10, wherein the instructions, when executed by the hardware processor, further cause the hardware processor to:
perform a security action in response to a determination that the integrity proof is not the expected value.

16. The system of claim 10, wherein the instructions, when executed by the hardware processor, further cause the hardware processor to:
verify a device identity certificate corresponding to the device identity; and
perform a security action in response to the verification of determining that the device identity certificate is not valid.

17. A non-transitory machine-readable storage medium storing instructions that, when executed by a physical processing element of a system, cause the system to:
receive a device identity provided by a device;
receive an integrity proof of the device, wherein the integrity proof is stored in a security co-processor of the device, and the integrity proof comprises a representation of a hardware component of the device and a representation of a firmware component of the device;
determine whether the integrity proof is an expected value based on an expected provisioning state of the device and the device identity; and
responsive to the determination of whether the integrity proof is the expected value, sign an integrity manifest certificate based on the integrity proof and the device identity to provide a signed integrity manifest certificate.

18. The medium of claim 17, wherein the instructions, when executed by the physical processing element, further cause the system to:
request the device identity from the device;
verify the device identity; and
responsive to the verification of the device identity, request the integrity proof from the device.

19. The medium of claim 17, wherein the instructions, when executed by the physical processing element, further cause the system to:
compare the integrity proof to an initial integrity manifest corresponding to the device.

20. The medium of claim 17, wherein the integrity proof represents event logs of the device, and the instructions, when executed by the processing element, further cause the system to:
determine the expected provisioning state of the device based on an initial integrity manifest corresponding to the device and the event logs.

* * * * *